United States Patent
Gregory et al.

(10) Patent No.: US 9,739,161 B2
(45) Date of Patent: Aug. 22, 2017

(54) VANED STRUCTURE AND A METHOD OF MANUFACTURING A VANED STRUCTURE

(71) Applicant: ROLLS-ROYCE PLC, London (GB)

(72) Inventors: Jonathan Mark Gregory, Cheltenham (GB); Oliver James Francis, Dursley (GB)

(73) Assignee: ROLLS-ROYCE plc, London (GB)

( * ) Notice: Subject to any disclaimer, the term of this patent is extended or adjusted under 35 U.S.C. 154(b) by 805 days.

(21) Appl. No.: 14/158,081

(22) Filed: Jan. 17, 2014

(65) Prior Publication Data

US 2014/0241871 A1    Aug. 28, 2014

(30) Foreign Application Priority Data

Feb. 27, 2013 (GB) .................................. 1303428.5

(51) Int. Cl.
*F01D 9/02* (2006.01)
*F23R 3/28* (2006.01)
(Continued)

(52) U.S. Cl.
CPC .............. *F01D 9/02* (2013.01); *B22F 3/1055* (2013.01); *B22F 5/106* (2013.01); *F01D 9/041* (2013.01);
(Continued)

(58) Field of Classification Search
CPC .... F23R 3/14; F23R 3/286; F23R 3/12; Y02T 50/675; F23C 7/004; F23C 2900/07001;
(Continued)

(56) References Cited

U.S. PATENT DOCUMENTS

| 4,845,940 A | 7/1989 | Beer |
| 5,115,634 A * | 5/1992 | Bretz ..................... B05B 7/066 60/778 |

(Continued)

FOREIGN PATENT DOCUMENTS

| DE | 699 27 025 T2 | 6/2006 |
| DE | 603 18 287 T2 | 12/2008 |

(Continued)

OTHER PUBLICATIONS

Aug. 1, 2013 Search Report issued in United Kingdom Patent Application No. GB1303428.5.
Jul. 24, 2015 Search Report issued in European Application No. 14151526.2.

*Primary Examiner* — Mark Laurenzi
*Assistant Examiner* — Wesley Harris
(74) *Attorney, Agent, or Firm* — Oliff PLC

(57) ABSTRACT

A fuel injector comprises a swirler and the swirler comprises a plurality of vanes, a first member and a second member. The second member is arranged coaxially around the first member and the vanes extend radially between the first and second members. The vanes have leading edges and the second member has an upstream end. The leading edges of the vanes extend with radial and axial components from the first member to the upstream end of the second member and the radially outer ends of the leading edges of the vanes form arches with the upstream end of the second member. The arrangement of the swirler enables the fuel injector to be built by direct laser deposition.

25 Claims, 4 Drawing Sheets

(51) Int. Cl.
*F01D 9/04* (2006.01)
*F23D 11/10* (2006.01)
*F23R 3/14* (2006.01)
*F23C 7/00* (2006.01)
*B22F 3/10* (2006.01)
*B22F 5/10* (2006.01)
*F23R 3/12* (2006.01)
*B22F 3/105* (2006.01)

(52) U.S. Cl.
CPC .............. *F01D 9/042* (2013.01); *F23C 7/004* (2013.01); *F23D 11/107* (2013.01); *F23R 3/12* (2013.01); *F23R 3/14* (2013.01); *F23R 3/286* (2013.01); *B22F 2003/1059* (2013.01); *F23C 2900/07001* (2013.01); *F23D 2206/10* (2013.01); *F23D 2900/11101* (2013.01); *F23D 2900/14021* (2013.01); *F23R 2900/00018* (2013.01); *Y02P 10/295* (2015.11); *Y02T 50/675* (2013.01); *Y10T 29/4932* (2015.01)

(58) Field of Classification Search
CPC .......... F23D 11/107; F23D 2900/11101; F23D 2900/14021; F23D 2206/10; F01D 9/02; F01D 9/041; F01D 9/042
See application file for complete search history.

(56) References Cited

U.S. PATENT DOCUMENTS

| | | | |
|---|---|---|---|
| 5,647,538 A * | 7/1997 | Richardson | ........... F23D 11/101 239/405 |
| 6,289,676 B1 | 9/2001 | Prociw et al. | |
| 6,298,654 B1 * | 10/2001 | Vermes | ................... F02C 6/006 60/39.41 |
| 6,460,344 B1 | 10/2002 | Steinthorsson et al. | |
| 2004/0040310 A1 | 3/2004 | Prociw et al. | |
| 2004/0061001 A1 | 4/2004 | Mao et al. | |
| 2007/0035069 A1 | 2/2007 | Wust et al. | |
| 2009/0224082 A1 | 9/2009 | MacMillan et al. | |
| 2009/0255262 A1 * | 10/2009 | McMasters | ............... F23R 3/14 60/742 |
| 2009/0255264 A1 | 10/2009 | McMasters et al. | |
| 2011/0180971 A1 | 7/2011 | Vagt et al. | |

FOREIGN PATENT DOCUMENTS

| | | |
|---|---|---|
| DE | 10 2008 002 940 A1 | 1/2009 |
| EP | 1 605 204 A2 | 12/2005 |
| EP | 1 798 475 A2 | 6/2007 |
| EP | 2 458 284 A2 | 5/2012 |
| EP | 2 549 183 A1 | 1/2013 |
| GB | 2 453 774 A | 4/2009 |

* cited by examiner

VANED STRUCTURE AND A METHOD OF MANUFACTURING A VANED STRUCTURE

FIELD OF THE INVENTION

The present invention relates to a vane structure and a method of manufacturing a vane structure. The present invention relates in particular to fuel injector comprising a vane structure designed to be manufactured by direct laser deposition and a method of manufacturing a fuel injector comprising a vane structure by direct laser deposition, and more particularly relates to a gas turbine engine fuel injector designed to be manufactured by direct laser deposition and a method of manufacturing a gas turbine engine fuel injector by direct laser deposition.

BACKGROUND TO THE INVENTION

Fuel injectors for gas turbine engine combustion chambers are currently manufactured using conventional manufacturing techniques to produce swirler vanes and swirler vane passages between the swirler vanes. Fuel injectors for gas turbine engine combustion chambers are currently manufactured by casting, machining from solid or electro-discharge machining from solid. The conventional manufacturing techniques limit the complexity of the shape of the swirler vanes and incur significant non-recurring costs each time the configuration of the swirler vanes is changed.

The direct laser deposition (DLD) manufacturing technique may offer significant advantages in that the configuration of the swirler vanes may be much more complex and the non-recurring costs of changing the configuration of the swirler vanes in minimal.

Direct laser deposition (DLD), alternatively known as selective laser sintering (SLS) or selective laser melting (SLM), is an additive manufacturing technique by which metallic parts are produced by fusing metallic powder particles together with a relatively low-power laser beam or other suitable radiation beam or energy beam. Direct laser deposition uses a computer aided design (CAD) model of a component, or article, and the CAD model of the component, or article, is divided into a plurality of layers. Layers of powder metal are sequentially placed on a powder bed apparatus and the radiation beam is moved in a predetermined pattern over the each layer of powder in turn to build up the component, or article, layer by layer.

However, it is difficult and expensive to manufacture fuel injectors for gas turbine engine combustion chambers using direct laser deposition because the configuration of the swirler vanes is such that the swirler vanes have over-hanging and/or re-entrant features. Currently the direct laser deposition process is limited to a maximum over-hang angle of about 30° relative to a horizontal plane and the direct laser deposition process builds up components or articles vertically. Over-hang angles less than this produce significant distortion of the component or article because the next layer of powder deposited is not sufficiently supported.

The over-hanging and/or re-entrant features require additional slave structures to be provided on the component, or article, to prevent distortion or loss of form, or shape, during the direct laser deposition manufacturing process. In addition these additional slave features have to be removed, e.g. machined, from the finished component, or article, adding cost and introducing a possibility of introducing defects in the component, or article, due to the machining process. The additional slave features form a scaffold structure that is modelled into the component, typically by modifying the computer aided design (CAD) model of the component using the direct laser deposition (DLD) software prior to start of the manufacturing process. The form of the additional slave features, or scaffold structure, is dependent on how the component is orientated relative to the horizontal plane of the powder bed apparatus. For example if the component is orientated such it is does not have any over-hanging, or un-supported, features, then no additional slave features are required.

Therefore the present invention seeks to provide a novel fuel injector which reduces or overcomes the above mentioned problem.

The present invention seeks to provide a novel method of manufacturing a fuel injector which reduces or overcomes the above mentioned problem.

STATEMENTS OF INVENTION

Accordingly the present invention provides a vane structure, the vane structure comprising a plurality of vanes, a first member and a second member, the second member being arranged coaxially with the first member, the vanes extending radially between the first and second members, the vanes having first edges and second edges, the first member having a first axial end and a second axial end, the second member having a first axial end and a second axial end, the first axial end of the second member being located at an axial position between the first axial end and the second axial end of the first member, the first edges of the vanes extending with radial and axial components from the first member to the first end of the second member and the radially outer ends of the first edges of the vanes forming arches with the first end of the second member.

The second member may be arranged coaxially around the first member, the first edges of the vanes being leading edges, the first axial end being an upstream end, the leading edges of the vanes extending with radial and axial components from the first member to the upstream end of the second member and the radially outer ends of the leading edges of the vanes forming arches with the upstream end of the second member.

The vane structure may comprise a swirler of a fuel injector.

The fuel injector may comprise a second swirler, the second swirler comprising a plurality of vanes and a third member, the third member being arranged coaxially around the second member, the vanes of the second swirler extending radially between the second and third members, the vanes of the second swirler having leading edges, the third member having an upstream end, the leading edges of the vanes of the second swirler extending with radial and axial components from the upstream end of the second member to the upstream end of the third member and the radially outer ends of the leading edges of the vanes of the second swirler forming arches with the upstream end of the third member.

The fuel injector may comprise a third swirler, the third swirler comprising a plurality of vanes and a fourth member, the fourth member being arranged coaxially around the third member, the vanes of the third swirler extending radially between the third and fourth members, the vanes of the third swirler having leading edges, the leading edges of the vanes of the third swirler extending with radial and axial components from the upstream end of the third member to the fourth member and the radially outer ends of the leading edges of the vanes of the third swirler forming arches with the fourth member.

The fourth member may have an upstream end, the leading edges of the vanes of the third swirler extend with radial and axial components from the upstream end of the third member to the upstream end of the fourth member and the radially outer ends of the leading edges of the vanes of the third swirler forming arches with the upstream end of the fourth member.

The fuel injector may comprise a fourth swirler, the fourth swirler comprising a plurality of vanes and a fifth member, the fifth member being arranged coaxially around the fourth member, the vanes of the fourth swirler extending radially between the fourth and fifth members, the vanes of the fourth swirler having leading edges, the leading edges of the vanes of the fourth swirler extending with radial and axial components from the upstream end of the fourth member to the fifth member and the radially outer ends of the leading edges of the vanes of the fourth swirler forming arches with the fifth member.

The fifth member may have an upstream end, the leading edges of the vanes of the fourth swirler extend with radial and axial components from the upstream end of the fourth member to the upstream end of the fifth member and the radially outer ends of the leading edges of the vanes of the fourth swirler forming arches with the upstream end of the fifth member.

The upstream end of the fourth member may be circular or elliptical. The upstream end of the fifth member may be circular or elliptical.

The leading edges of the vanes of the swirler may be arranged at a maximum angle of 60° to the axis. The leading edges of the vanes of the second swirler may be arranged at a maximum angle of 60° to the axis. The leading edges of the vanes of the third swirler may be arranged at a maximum angle of 60° to the axis. The leading edges of the vanes of the fourth swirler may be arranged at a maximum angle of 60° to the axis.

The radially inner end of each vane of the second swirler may be positioned at an apex of a respective arch formed by the radially outer ends of the vanes of the swirler and the upstream end of the second member.

The radially inner end of each vane of the third swirler may be positioned at an apex of a respective arch formed by the radially outer ends of the vanes of the second swirler and the upstream end of the third member.

The radially inner end of each vane of the fourth swirler may be positioned at an apex of a respective arch formed by the radially outer ends of the vanes of the third swirler and the upstream end of the fourth member.

The first swirler, the second swirler, the third swirler and the fourth swirler may be air swirlers.

An additional swirler may be located within the first member.

The fuel injector may be a rich burn fuel injector. The fuel injector may be a lean burn fuel injector.

The vane structure may comprise a compressor vane structure, a turbine vane structure, a combustor nozzle guide vane structure or a fan outlet guide vane structure.

The leading edges of the vanes may be arranged at a maximum angle of 60° to the axis.

The present invention also provides a method of manufacturing a vane structure, the vane structure comprising a plurality of vanes, a first member and a second member, the second member being arranged coaxially with the first member, the vanes extending radially between the first and second members, the vanes having first edges and second edges, the first member having a first axial end and a second axial end, the second member having a first axial end and a second axial end, the first axial end of the second member being located at an axial position between the first axial end and the second axial end of the first member, the first edges of the vanes extending with radial and axial components from the first member to the first end of the second member and the radially outer ends of the first edges of the vanes forming arches with the first end of the second member, the method comprising a) depositing a layer of powder metal in a plane perpendicular to the axis of the vane structure, b) moving an energy beam in a predetermined pattern over the layer of powder metal to fuse the powder metal in the predetermined pattern in the layer of powder metal, c) repeating steps a) and b) to produce the vane structure.

The second member may be arranged coaxially around the first member, the first edges of the vanes being leading edges, the first axial end being an upstream end, the leading edges of the vanes extending with radial and axial components from the first member to the upstream end of the second member and the radially outer ends of the leading edges of the vanes forming arches with the upstream end of the second member.

Step b) may comprise moving a laser beam or an electron beam over the layer of powder metal to fuse the powder metal.

The present invention also provides a fuel injector comprising a swirler, the swirler comprising a plurality of vanes, a first member and a second member, the second member being arranged coaxially around the first member, the vanes extending radially between the first and second members, the vanes having leading edges, the second member having an upstream end, the leading edges of the vanes extending with radial and axial components from the first member to the upstream end of the second member and the radially outer ends of the leading edges of the vanes forming arches with the upstream end of the second member.

The present invention also provides a method of manufacturing a fuel injector comprising a swirler, the swirler comprising a plurality of vanes, a first member and a second member, the second member being arranged coaxially around the first member, the vanes extending radially between the first and second members, the vanes having leading edges, the second member having an upstream end, the leading edges of the vanes extending with radial and axial components from the first member to the upstream end of the second member and the radially outer ends of the leading edges of the vanes forming arches with the upstream end of the second member, the method comprising a) depositing a layer of powder metal in a plane perpendicular to the axis of the fuel injector, b) moving an energy beam in a predetermined pattern over the layer of powder metal to fuse the powder metal in the predetermined pattern in the layer of powder metal, c) repeating steps a) and b) to produce the fuel injector.

BRIEF DESCRIPTION OF THE DRAWINGS

The present invention will be more fully described by way of example with reference to the accompanying drawings, in which.

DETAILED DESCRIPTION

Figure 1:
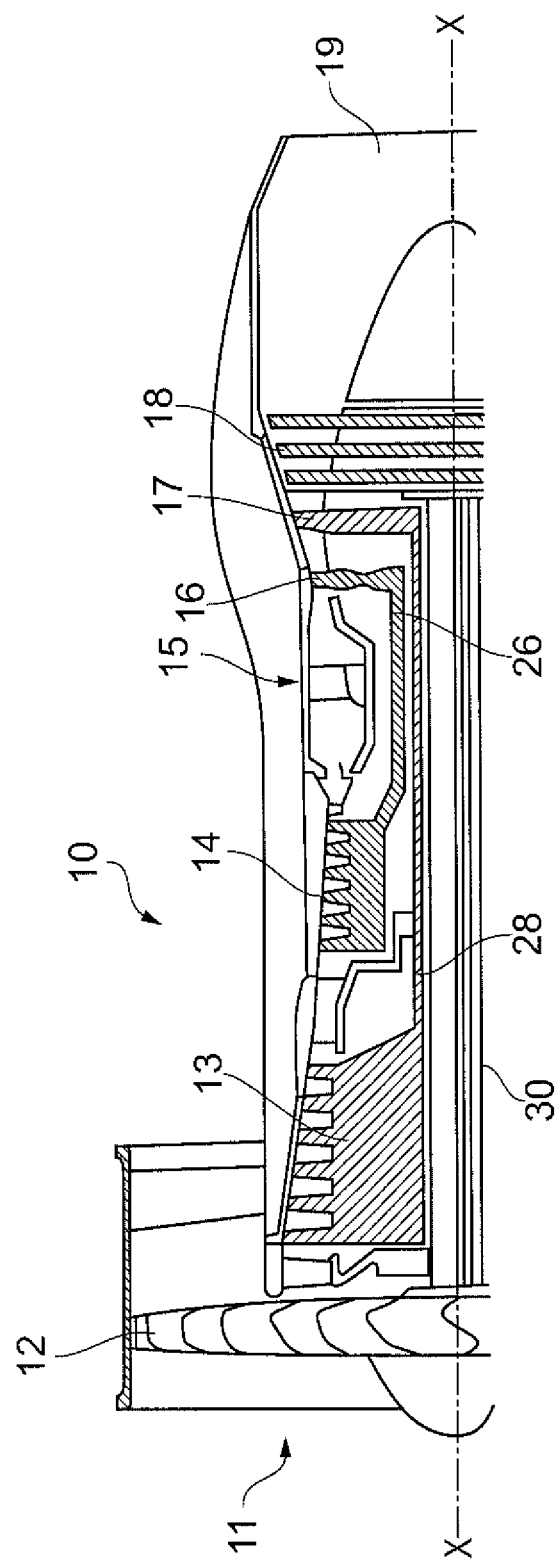
FIG. 1 is partially cut away view of a turbofan gas turbine engine having a fuel injector comprising a vane structure according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
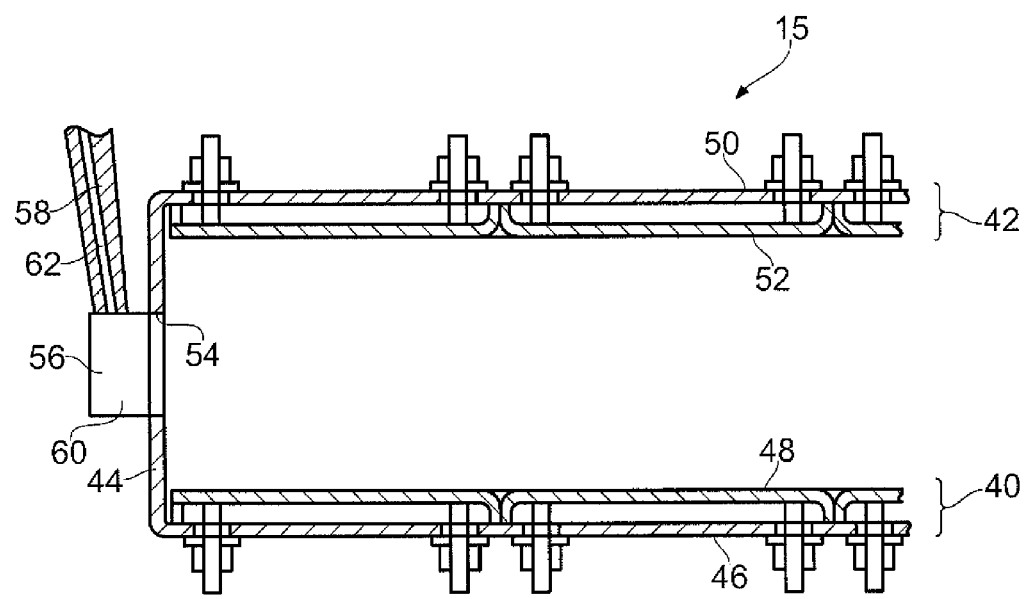
FIG. 2 is an enlarged cross-sectional view of a combustion chamber of the turbofan gas turbine engine having a fuel injector comprising a vane structure according to the present invention.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10. Each of the fuel injectors 56 is a fuel injector according to the present invention.

Figure 3:
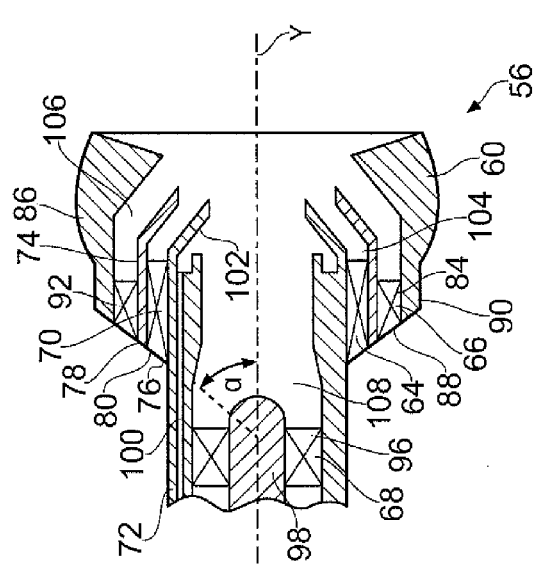
FIG. 3 is an enlarged cross-sectional view of a fuel injector comprising a vane structure according to the present invention.
Figure 4:
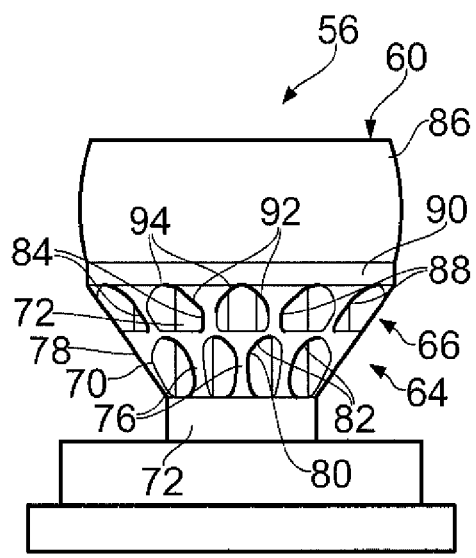
FIG. 4 is a plan view of the fuel injector in FIG. 3 in the direction of arrow A.
Figure 5:
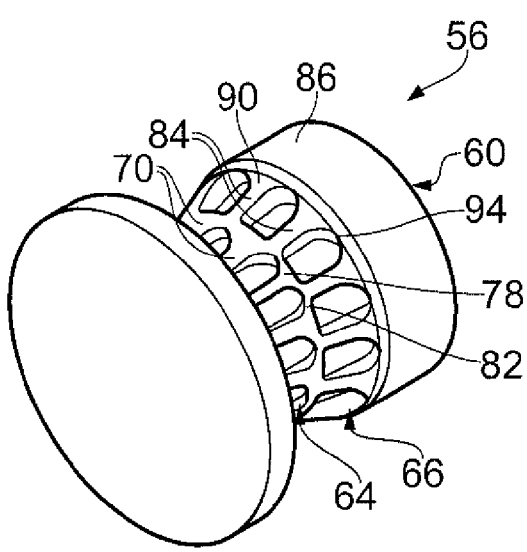
FIG. 5 is a perspective view of the fuel injector in FIG. 3.

A fuel injector 56 according to the present invention is shown more clearly in FIGS. 3 to 5. The fuel injector 56 is a rich burn fuel injector and comprises a fuel feed arm 58 and a fuel injector head 60.

The fuel injector arm 58 is hollow and has a fuel supply passage 62 to supply fuel into the fuel injector head 60. The fuel injector head 60 has an axis Y and comprises a first swirler 64, a second swirler 66 and an additional swirler 68. The first swirler 64 comprises a plurality of vanes 70, a first member 72 and a second member 74. The second member 74 is arranged coaxially around the first member 72 and the vanes 70 extend radially between the first and second members 72 and 74. The vanes 70 have leading edges 76 and the second member 74 has an upstream end 78. The leading edges 76 of the vanes 70 extend with radial and axial components from the first member 72 to the upstream end 78 of the second member 74 and the radially outer ends 80 of the leading edges 76 of the vanes 70 form arches 82 with the upstream end 78 of the second member 74. In particular the leading edges 76 of the vanes 70 extend with axial downstream components from the first member 72 to the upstream end 78 of the second member 74.

The second swirler 66 comprises a plurality of vanes 84 and a third member 86. The third member 86 is arranged coaxially around the second member 74. The vanes 84 of the second swirler 66 extend radially between the second and third members 74 and 86. The vanes 84 of the second swirler 66 have leading edges 88 and the third member 86 has an upstream end 90. The leading edges 88 of the vanes 84 of the second swirler 66 extend with radial and axial components from the upstream end 78 of the second member 74 to the upstream end 90 of the third member 86 and the radially outer ends 92 of the leading edges 88 of the vanes 84 of the second swirler 66 form arches 94 with the upstream end 90 of the third member 86. In particular the leading edges 88 of the vanes 84 extend with axial downstream components from the upstream end 78 of the second member 74 to the upstream end 90 of the third member 86.

The first member 72, the second member 74 and the third member 86 are generally annular members with a common axis Y. Thus, the upstream end of the first member 72 is upstream of the upstream end 78 of the second member 74 and the upstream end 78 of the second member 74 is upstream of the upstream end 90 of the third member 86.

The additional swirler 68 comprises a plurality of vanes 96 and a central member 98. The central member 98 is positioned coaxially within the first member 72. The vanes 96 of the additional swirler 68 extend radially between the central member 98 and the first member 72.

The outer surface of the downstream end of the first member 72 tapers/converges towards the axis Y of the fuel injector head 60. The first member 72 is provided with one or more passages 100 to supply fuel from the fuel supply passage 62 in the fuel feed arm 58 to a pre-filming surface 102 at the downstream end of the first member 72. The downstream end of the second member 74 tapers/converges towards the axis Y of the fuel injector head 60 and the inner surface of the downstream end of the third member 86 initially tapers/converges towards the axis Y of the fuel injector head 60 and then diverges away from the axis Y of the fuel injector head 60. An annular passage 104 is defined between the first member 72 and the second member 74 and an annular passage 106 is defined between the second member 74 and the third member 86. A central passage 108 is defined within the first member 74 and the central passage 108 is an annular passage between the central member 98 and the first member 72.

In this example the leading edges 76 of the vanes 70 of the first swirler 64 are arranged at a maximum angle α of 60° to the axis Y of the fuel injector head 60 and the leading edges 88 of the vanes 84 of the second swirler 66 are also arranged at a maximum angle α of 60° to the axis Y of the fuel injector head 60. The arches 82 and 94 may comprise straight edge arches which are angled at 30° relative to a plane perpendicular to the axis Y of the fuel injector head 60. The arches 82 and 94 may have a pointed apex, or a curved apex, at the junction with the adjoining second and third members 74 and 86 respectively. The leading edges of any of the sets of vanes 70 and 84 may be arranged at an angle of 50° to 60° to the axis Y of the fuel injector head 60.

In operation fuel is injected onto the pre-filming surface 104 of the first member 74 and the fuel is atomised by swirling flows of air in the central passage 108 and the annular passage 104. A further swirling flow of air is provided in the annular passage 106 to assist atomisation and distribution of the fuel and air mixture into the combustion chamber 15 as is well known to those skilled in the art.

It is seen that the fuel injector head 60 is arranged such that the leading edges 76 and 88 of the vanes 70 and 84 respectively are arranged to extend with axial downstream components from the first member 72 to the upstream end 78 of the second member 74 and from the second member 74 to the upstream end 90 of the third member 86 respectively. In addition it is seen that the fuel injector head 60 is arranged such that the radially outer ends 80 and 92 of the leading edges 76 and 88 of the vanes 70 and 84 respectively form arches 82 and 94 with the upstream ends 78 and 90 of the second and third member 74 and 86 respectively. These features enable the fuel injector head 60 and in particular the first and second swirlers 64 and 66 of the fuel injector head 60 to be manufactured by direct laser deposition. These features enable the vanes 70 of the first swirler 64 to provide support between the first member 72 and the second member 74 and the vanes 84 of the second swirler 66 to provide support between the second member 74 and the third member 86 during the direct laser deposition process.

Figure 6:
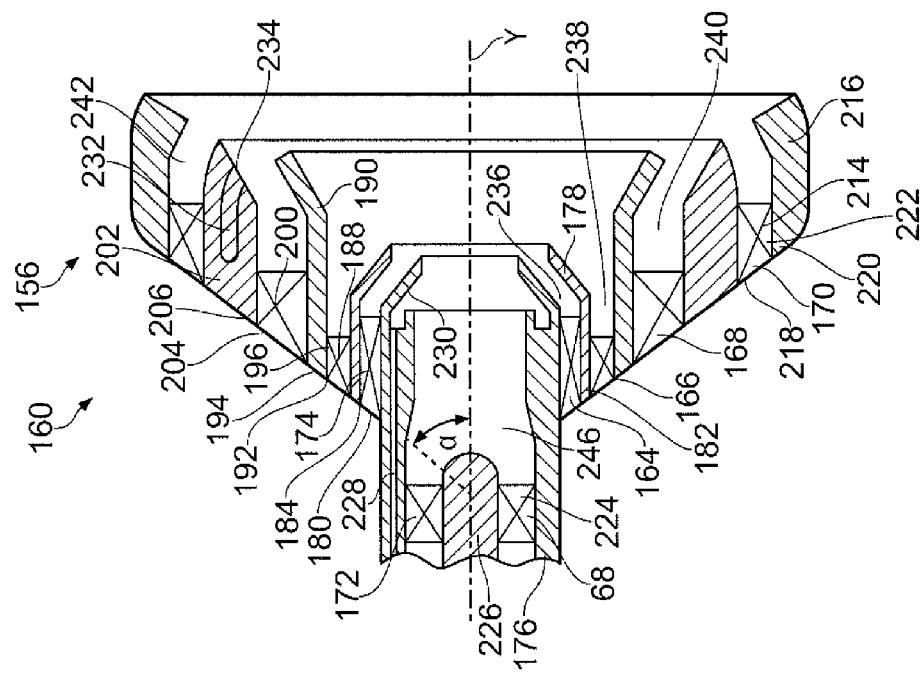
FIG. 6 is an enlarged cross-sectional view of a further fuel injector comprising a vane structure according to the present invention.

A further fuel injector 156 according to the present invention is shown more clearly in FIG. 6. The fuel injector 156 is a lean burn fuel injector and comprises a fuel feed arm and a fuel injector head 160.

The fuel injector arm is hollow and has a fuel supply passage to supply fuel into the fuel injector head 160. The fuel injector head 160 comprises a first swirler 164, a second swirler 166, a third swirler 168, a fourth swirler 170 and an additional swirler 172. The first swirler 164 comprises a plurality of vanes 174, a first member 176 and a second member 178. The second member 178 is arranged coaxially around the first member 176 and the vanes 174 extend radially between the first and second members 176 and 178. The vanes 174 have leading edges 180 and the second member 178 has a leading edge 182. The leading edges 180 of the vanes 174 extend with radial and axial components from the first member 176 to the upstream end 182 of the second member 178 and the radially outer ends 184 of the leading edges 180 of the vanes 174 form arches with the upstream end 182 of the second member 178. In particular the leading edges 180 of the vanes 174 extend with axial downstream components from the first member 176 to the upstream end 182 of the second member 178.

The second swirler 166 comprises a plurality of vanes 188 and a third member 190. The third member 190 is arranged coaxially around the second member 178. The vanes 188 of the second swirler 166 extend radially between the second and third members 178 and 190. The vanes 188 of the second swirler 166 have leading edges 192 and the third member 190 has a leading edge 194. The leading edges 192 of the vanes 188 of the second swirler 166 extend with radial and axial components from the upstream end 182 of the second member 178 to the upstream end 194 of the third member 190 and the radially outer ends 196 of the leading edges 192 of the vanes 188 of the second swirler 166 form arches with the upstream end 194 of the third member 190. In particular the leading edges 192 of the vanes 188 extend with axial downstream components from the upstream end 182 of the second member 178 to the upstream end 194 of the third member 190.

The third swirler 168 comprises a plurality of vanes 200 and a fourth member 202. The fourth member 202 is arranged coaxially around the third member 190. The vanes 200 of the third swirler 168 extend radially between the third and fourth members 190 and 202. The vanes 200 of the third swirler 168 have leading edges 204 and the fourth member 202 has a leading edge 206. The leading edges 204 of the vanes 200 of the third swirler 168 extend with radial and axial components from the upstream end 194 of the third member 190 to the fourth member 202 and the radially outer ends 208 of the leading edges 204 of the vanes 200 of the third swirler 168 form arches with the fourth member 202. In this example the leading edges 204 of the vanes 200 of the third swirler 168 extend with radial and axial components from the upstream end 194 of the third member 190 to the upstream end 212 of the fourth member 202 and the radially outer ends of the leading edges 204 of the vanes 200 of the third swirler 168 form arches with the upstream end 212 of the fourth member 202.

The fourth swirler 170 comprises a plurality of vanes 214 and a fifth member 216. The fifth member 216 is arranged coaxially around the fourth member 202. The vanes 214 of the fourth swirler 170 extend radially between the fourth and fifth members 202 and 216. The vanes 214 of the fourth swirler 170 have leading edges 218 and the fifth member 216 has a leading edge 220. The leading edges 218 of the vanes 214 of the fourth swirler 170 extend with radial and axial components from the upstream end 212 of the fourth member 202 to the fifth member 216 and the radially outer ends 222 of the leading edges 218 of the vanes 214 of the fourth swirler 170 form arches with the fifth member 216.

The first member 176, the second member 178, the third member 190, the fourth member 202 and the fifth member 216 are generally annular members. Thus, the upstream end of the first member 176 is upstream of the upstream end 182 of the second member 178 and the upstream end 182 of the second member 178 is upstream of the upstream end 194 of the third member 190, the upstream end 194 of the third member 190 is upstream of the upstream end 212 of the fourth member 202 and the upstream end 212 of the fourth member 202 is upstream of the upstream end of the fifth member 216.

The additional swirler 172 comprises a plurality of vanes 224 and a central member 226. The central member 226 is positioned coaxially within the first member 176. The vanes 224 of the additional swirler 172 extend radially between the central member 226 and the first member 176.

The outer surface of the downstream end of the first member 176 tapers/converges towards the axis Y of the fuel injector head 60. The first member 176 is provided with one or more passages 228 to supply fuel from the fuel supply passage 62 in the fuel feed arm 158 to a pre-filming surface 230 at the downstream end of the first member 176. The downstream end of the second member 178 tapers/converges towards the axis Y of the fuel injector head 60 and the downstream end of the third member 190 diverges away from the axis Y of the fuel injector head 160. The fourth member 202 is provided with one or more passages 232 to supply fuel from the fuel supply passage 62 in the fuel feed arm 58 to a pre-filming surface 234 at the downstream end of the fourth member 202. The pre-filming surface 234 is a radially inner surface. The pre-filming surface 234 at the downstream end of the fourth member 202 diverges away from the axis Y of the fuel injector head 160. The radially outer surface at the downstream end of the fourth member 202 tapers/converges towards the axis Y of the fuel injector head 160. The downstream end of the fifth member 216 initially tapers/converges towards the axis Y of the fuel injector head 160 and then diverges away from the axis Y of the fuel injector head 160.

An annular passage 236 is defined between the first member 176 and the second member 178 and an annular passage 238 is defined between the second member 178 and the third member 190. An annular passage 240 is defined between the third member 190 and the fourth member 202 and an annular passage 242 is defined between the fourth member 202 and the fifth member 216. A central passage 246 is defined within the first member 176 and the central passage 246 is an annular passage between the central member 226 and the first member 176.

In this example the leading edges 180 of the vanes 174 of the first swirler 164 are arranged at a maximum angle of 60° to the axis Y of the fuel injector head 160 and the leading edges 192 of the vanes 188 of the second swirler 166 are arranged at a maximum angle of 60° to the axis Y of the fuel injector head 160. The leading edges 204 of the vanes 200 of the third swirler 168 are arranged at a maximum angle of 60° to the axis Y of the fuel injector head 160 and the leading edges 218 of the vanes 214 of the fourth swirler 170 are arranged at a maximum angle of 60° to the axis Y of the fuel injector head 160. The arches 186, 198, 210 and 222 may comprise straight edge arches which are angled at 30° relative to a plane perpendicular to the axis Y of the fuel injector head 160. The arches 186, 198, 210 and 222 may have a pointed apex, or a curved apex, at the junction with the adjoining second, third, fourth and fifth members 178, 190, 202 and 216 respectively. The leading edges of any of the sets of vanes 180, 188, 200 and 214 may be arranged at an angle of 50° to 60° to the axis Y of the fuel injector head 160.

In operation fuel is injected onto the pre-filming surface 230 of the first member 176 and fuel is injected onto the pre-filming surface 234 of the fourth member 202. The fuel on the pre-filming surface 230 is atomised by swirling flows of air in the central passage 246 and the annular passage 236. The fuel on the pre-filming surface 234 is atomised by swirling flows of air in the annular passage 240 and the annular passage 242.

It is seen that the fuel injector head is arranged such that the leading edges of the vanes are arranged to extend with axial downstream components from the first member to the upstream end of the second member and from the second member to the upstream end of the third member respectively. In addition it is seen that the fuel injector head is arranged such that the radially outer ends of the leading edges of the vanes form arches with the upstream ends of the second and third members respectively. The leading edges of the vanes are arranged to extend with axial downstream components from the third member to the upstream end of the fourth member and from the fourth member to the upstream end of the fifth member respectively. In addition it is seen that the fuel injector head is arranged such that the radially outer ends of the leading edges of the vanes form arches with the upstream ends of the fourth and fifth members respectively. These features enable the fuel injector head and in particular the first, second, third and fourth swirlers of the fuel injector head to be manufactured by direct laser deposition. These features enable the vanes of the first swirler to provide support between the first member and the second member, the vanes of the second swirler to provide support between the second member and the third member, the vanes of the third swirler to provide support between the third member and the fourth member and the vanes of the fifth swirler to provide support between the fourth member and the fifth member during the direct laser deposition process.

Figure 7:
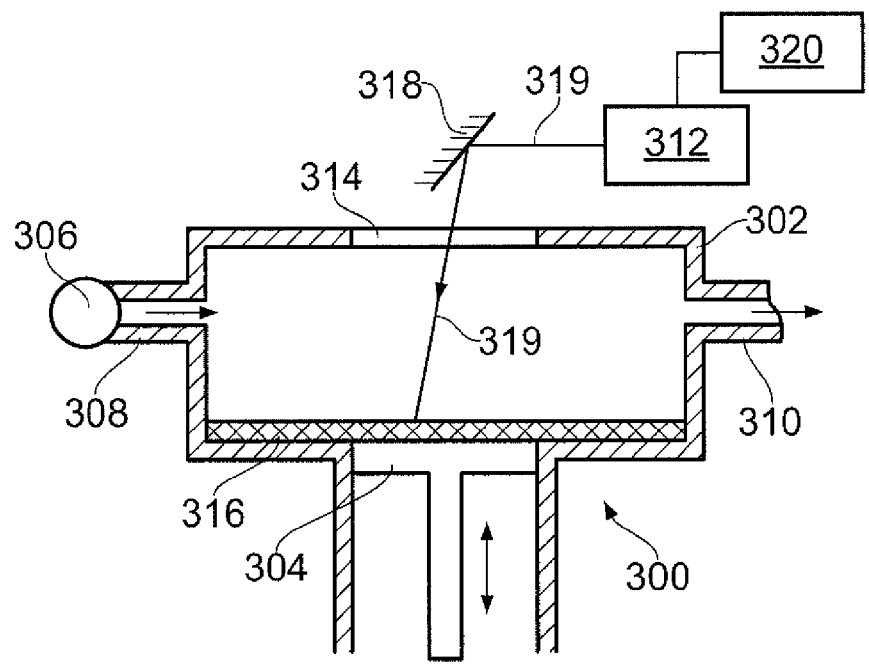
FIG. 7 is an apparatus for use in a method of manufacturing a fuel injector comprising a vane structure by direct laser deposition according to the present invention.

The fuel injector 56 and/or the fuel injector 156 are manufactured using direct laser deposition or powder bed fusion using an apparatus 300 shown in FIG. 7. Powder bed fusion uses a laser beam or an electron beam to melt and fuse powder particles together to build up an article layer by layer from powder material, e.g. powder metal, by moving the laser beam, or electron beam, in a predetermined pattern, or path, across sequentially deposited layers of powder material.

The apparatus 300 comprises a sealed chamber 302, which has a retractable platform 304. A pump 306 is provided to supply an inert gas, argon or nitrogen, through a pipe 308 into the chamber 302 and gas is extracted from the chamber 302 via a pipe 310. A laser 312, e.g. an infrared laser, is provided to direct a laser beam 319 through a window 314 in the chamber 302. A controller 320 has a CAD definition of the shape and features of the fuel injector head 60 or fuel injector head 160 and the laser 312 is moved under the control of the controller 320.

The fuel injector head 60 and/or fuel injector head 160 is manufactured by placing a first layer 316 of a suitable metal, or alloy, powder, on the retractable platform 304 in the sealed chamber 302. The laser beam 319 is scanned across the layer of metal powder 316 in a predetermined pattern to form a first layer of the fuel injector head 60 or 160 by bodily moving the laser 312 appropriate distances in perpendicular X and Y directions or by deflecting the laser beam 319 off a movable mirror 318. The laser beam 319 melts and fuses or sinters the metal powder where it strikes the layer of metal powder 316. Then a second, thin, layer of metal, or alloy, is placed on the first layer, the platform 304 is retracted one increment outwards from the chamber 302 and the laser beam 319 is scanned across the layer of metal powder in a further predetermined pattern to form a second layer of the fuel injector head 60 or 160 respectively. The laser beam 319 melts and fuses or sinters the metal powder where it strikes the second layer of metal powder 316 and bonds, fuses or sinters the second layer of the fuel injector 60 or 160 to the first layer of the fuel injector 60 or 160 respectively. The process of placing layers of metal powder, retracting the platform 304 and scanning the laser beam 319 across the layer of metal powder in a predetermined pattern to fuse and sinter the metal powder in each layer and to bond each layer to the previously deposited layer is repeated a sufficient number of times to build the fuel injector 60 or 160 layer by layer from one axial end to the opposite axial end. The predetermined pattern of scanning of the laser beam 319 for each layer is determined by the CAD model of the fuel injector 60 or 160. It is necessary to remove the un-fused, or un-sintered, metal powder from the fuel injector head 60 or 160 and this may be by inverting the fuel injector head 60 or 160 to pour out the un-fused metal powder. This removal of the un-fused metal powder may be assisted by vibration, air blast etc. The un-fused, or un-sintered, metal powder is removed in particular from the regions forming the annular passages between the members and between the vanes in the passages and passages within the members forming fuel passages. The fuel injector head 60 or 160 is built up layer-by-layer as mentioned previously and in particular the fuel injector head 60 or 160 is built up by depositing the layers of powder metal 316 in planes perpendicular to the axis Y of the fuel injector head 60 or 160 such that the fuel injector head 60 or 160 is built up axially from one axial end to the other axial end, e.g. from its axially upstream end to its axially downstream end. The first member has a first end and a second end, the second member has a first end and a second end, the third member has a first end and a second end. The first end of the first member is upstream of the first end of the second member and the first end of the second member is upstream of the first end of the third member. The fuel injector head 60 or 160 is built up layer-by-layer starting at the first end of the first member. The direct laser deposition process is limited to a maximum over-hang angle of about 30° relative to a horizontal plane and the direct laser deposition process builds up components or articles vertically layer by layer.

The fuel injector is manufactured from a suitable metal, or suitable alloy, powder for example a nickel superalloy powder. Each layer of metal powder deposited is approximately 20 microns thick to control the surface finish of the finished fuel injector.

The lean burn fuel injector of FIG. 6 may be arranged such that the fourth and fifth members extend the full axial length of the fuel injector head in which case the vanes of the third swirler extend in an upstream direction from the upstream end of the third member to the fourth member and the radially inner ends of the leading edges of the vanes of the third swirler form arches with the third member.

The present invention provides a fuel injector which is self supporting to minimise the cost of manufacturing the fuel injector by direct laser deposition so that it is not necessary to produce a fuel injector with additional slave features to support the fuel injector during the direct laser deposition manufacturing process. The self supporting fuel injector avoids the need to remove the additional slave features once the fuel injector has been manufactured. This reduces the part-cost for producing a fuel injector, removes the need for additional machining and reduces the possibility of producing variations, due to additional machining, in the fuel injectors, e.g. reduces the possibility of non-conformance of the fuel injectors.

Although the present invention has been described with reference to the manufacture of the fuel injector by direct laser deposition in which a laser beam is used to fuse/melt the powder metal it is equally possible to use an electron beam, a suitable radiation beam or a suitable energy beam to fuse/melt the powder metal.

The present invention is equally applicable to the manufacture of other vaned structures for example gas turbine engine fuel injector fuel swirlers, compressor vanes, turbine vanes, combustor nozzle guide vanes and fan outlet guide vanes. The present invention is also applicable to other vaned structures for example flow straighteners or oil misters. However, in the case of compressor vanes, turbine vanes, combustor nozzle guide vanes and fan outlet guide vanes the first member may comprise a sector of an annulus and the second member may be a sector of an annulus and the second member is again arranged coaxially with the first member and a number of vanes extend radially between the first and second members. A number of these vaned structures may be assembled together to form a full annulus, by securing them together by bonding, brazing, welding and/or using interlocking features. This enables vaned structures with large radii to be manufactured in a powder bed. The combustor nozzle guide vanes and the turbine vanes may be manufactured from nickel base superalloys, the compressor vanes and fan outlet guide vanes may be manufactured from a titanium alloy, a nickel alloy, an aluminium alloy or steel. The compressor vanes, turbine vanes, combustor nozzle guide vanes and fan outlet guide vanes may additionally extend between the first and second members with circumferential components in addition to the axial and radial components.

The invention claimed is:

1. A vaned structure comprising a plurality of vanes, a first member and a second member,
   the second member being arranged coaxially with the first member,
   the plurality of vanes extending radially between the first and second members, the plurality of vanes having first edges and second edges,
   the first member having a first axial end and a second axial end,
   the second member having a first axial end and a second axial end,
   the first axial end of the second member being located at an axial position between the first axial end and the second axial end of the first member,
   the first edges of the plurality of vanes extending radially and axially from the first member to the first end of the second member and
   radially outer ends of the first edges of the plurality of vanes forming arches with the first end of the second member.

2. A vaned structure as claimed in claim 1, wherein the second member is arranged coaxially around the first member, the first edges of the plurality of vanes are leading edges, the first axial end of the second member is an upstream end, the leading edges of the plurality of vanes extend with radial and axial components from the first member to the upstream end of the second member and the radially outer ends of the leading edges of the plurality of vanes form arches with the upstream end of the second member.

3. A vaned structure as claimed in claim 1, wherein the vaned structure is selected from the group consisting of a compressor vaned structure, a turbine vaned structure, a combustor nozzle guide vaned structure and a fan outlet guide vaned structure.

4. A vaned structure as claimed in claim 3, wherein the leading edges of the plurality of vanes are arranged at a maximum angle of 60° to an axis of the vaned structure.

5. A method of manufacturing a vaned structure, the vaned structure comprising a plurality of vanes, a first member and a second member,
   the second member being arranged coaxially with the first member,
   the plurality of vanes extending radially between the first and second members, the plurality of vanes having first edges and second edges,
   the first member having a first axial end and a second axial end,
   the second member having a first axial end and a second axial end,
   the first axial end of the second member being located at an axial position between the first axial end and the second axial end of the first member,
   the first edges of the plurality of vanes extending radially and axially from the first member to the first end of the second member and radially outer ends of the first edges of the plurality of vanes forming arches with the first end of the second member, the method comprising a) depositing a layer of powder metal in a plane perpendicular to an axis of the vaned structure, b) moving an energy beam in a predetermined pattern over the layer of powder metal to fuse the powder metal in the predetermined pattern in the layer of powder metal, c) repeating steps a) and b) to produce the vaned structure.

6. A method as claimed in claim 5, wherein the second member is arranged coaxially around the first member, the first edges of the plurality of vanes are leading edges, the first axial end of the second member is an upstream end, the leading edges of the plurality of vanes extend with radial and axial components from the first member to the upstream end of the second member and the radially outer ends of the leading edges of the plurality of vanes form arches with the upstream end of the second member.

7. A method as claimed in claim 5, wherein step b) comprises moving a laser beam or an electron beam over the layer of powder metal to fuse the powder metal.

8. A fuel injector comprising a swirler,
the swirler comprising a plurality of vanes, a first member and a second member, the swirler having an axis,
the second member being arranged coaxially around the first member,
the plurality of vanes extending radially between the first and second members, the plurality of vanes having leading edges and trailing edges,
the first member having a first axial end and a second axial end, the first axial end of the first member being an upstream end and the second axial end of the first member being a downstream end,
the second member having a first axial end and a second axial end, the first axial end of the second member being an upstream end and the second axial end of the second member being a downstream end,
the first axial end of the second member being located at an axial position between the first axial end and the second axial end of the first member,
the leading edges of the plurality of vanes extending radially and axially from the first member to the upstream end of the second member and
radially outer ends of the leading edges of the plurality of vanes forming arches with the upstream end of the second member.

9. A fuel injector as claimed in claim 8, wherein the leading edges of the plurality of vanes of the swirler are arranged at a maximum angle of 60° to the axis.

10. A fuel injector as claimed in claim 8, wherein the first member has a cylindrical outer surface portion, the second member has a cylindrical inner surface portion and the plurality of vanes extend from the cylindrical outer surface portion of the first member to the cylindrical inner surface portion of the second member.

11. A fuel injector as claimed in claim 8, wherein the trailing edges of the plurality of vanes extend perpendicularly to the axis of the swirler.

12. A fuel injector as claimed in claim 8, wherein the first member has a cylindrical outer surface portion, the second member has a cylindrical inner surface portion, the plurality of vanes extend from the cylindrical outer surface portion of the first member to the cylindrical inner surface portion of the second member and the trailing edges of the plurality of vanes extend perpendicularly to the axis of the swirler.

13. A fuel injector as claimed in claim 8, wherein the radially outer ends of the leading edges of the plurality of vanes increase in circumferential thickness in a radially outward direction to form the arches with the first axial end of the second member.

14. A fuel injector as claimed in claim 8, wherein the arches form an apex at a junction with the second member, the apex being selected from the group consisting of a pointed apex and a curved apex.

15. A fuel injector as claimed in claim 8, further comprising a second swirler, the second swirler comprising a plurality of vanes and a third member,
the third member being arranged coaxially around the second member,
the plurality of vanes of the second swirler extending radially between the second and third members,
the plurality of vanes of the second swirler having leading edges,
the third member having an upstream end,
the leading edges of the plurality of vanes of the second swirler extending with radial and axial components from the upstream end of the second member to the upstream end of the third member and
radially outer ends of the leading edges of the plurality of vanes of the second swirler forming arches with the upstream end of the third member.

16. A fuel injector as claimed in claim 15, further comprising a third swirler, the third swirler comprising a plurality of vanes and a fourth member,
the fourth member being arranged coaxially around the third member,
the plurality of vanes of the third swirler extending radially between the third and fourth members,
the plurality of vanes of the third swirler having leading edges,
the leading edges of the plurality of vanes of the third swirler extending with radial and axial components from the upstream end of the third member to the fourth member and
radially outer ends of the leading edges of the plurality of vanes of the third swirler forming arches with the fourth member.

17. A fuel injector as claimed in claim 16, wherein the fourth member has an upstream end, the leading edges of the plurality of vanes of the third swirler extend with radial and axial components from the upstream end of the third member to the upstream end of the fourth member and the radially outer ends of the leading edges of the plurality of vanes of the third swirler form arches with the upstream end of the fourth member.

18. A fuel injector as claimed in claim 16, further comprising a fourth swirler, the fourth swirler comprising a plurality of vanes and a fifth member,
the fifth member being arranged coaxially around the fourth member,
the plurality of vanes of the fourth swirler extending radially between the fourth and fifth members,
the plurality of vanes of the fourth swirler having leading edges,
the leading edges of the vanes of the plurality of fourth swirler extending with radial and axial components from an upstream end of the fourth member to the fifth member and
radially outer ends of the leading edges of the plurality of vanes of the fourth swirler forming arches with the fifth member.

19. A fuel injector as claimed in claim 18, wherein the fifth member has an upstream end, the leading edges of the plurality of vanes of the fourth swirler extend with radial and axial components from the upstream end of the fourth member to the upstream end of the fifth member and the radially outer ends of the leading edges of the plurality of vanes of the fourth swirler form arches with the upstream end of the fifth member.

20. A fuel injector as claimed in claim 18, wherein the leading edges of the plurality of vanes of the fourth swirler are arranged at a maximum angle of 60° to the axis.

21. A fuel injector as claimed in claim 18, wherein a radially inner end of each vane of the fourth swirler is positioned at an apex of a respective arch formed by the radially outer ends of the plurality of vanes of the third swirler and the upstream end of the fourth member.

22. A fuel injector as claimed in claim 16, wherein the leading edges of the plurality of vanes of the third swirler are arranged at a maximum angle of 60° to the axis.

23. A fuel injector as claimed in claim 16, wherein a radially inner end of each vane of the third swirler is positioned at an apex of a respective arch formed by the radially outer ends of the plurality of vanes of the second swirler and the upstream end of the third member.

24. A fuel injector as claimed in claim 15, wherein the leading edges of the plurality of vanes of the second swirler are arranged at a maximum angle of 60° to the axis.

25. A fuel injector as claimed in claim 15, wherein a radially inner end of each vane of the second swirler is positioned at an apex of a respective arch formed by the radially outer ends of the plurality of vanes of the swirler and the upstream end of the second member.

* * * * *